Nov. 6, 1928.

H. E. BIRKHOLZ

AIR FILTER

Filed Sept. 24, 1926 — 4 Sheets-Sheet 1

1,690,813

INVENTOR
HANS E. BIRKHOLZ

WITNESSES

ATTYS

Nov. 6, 1928.

H. E. BIRKHOLZ

AIR FILTER

Filed Sept. 24, 1926     4 Sheets-Sheet 2

1,690,813

WITNESSES
Adolph Berg
John E. Titus

INVENTOR
HANS E BIRKHOLZ
Rummler + Rummler
ATTY'S

Nov. 6, 1928.
H. E. BIRKHOLZ
1,690,813
AIR FILTER
Filed Sept. 24, 1926    4 Sheets-Sheet 3
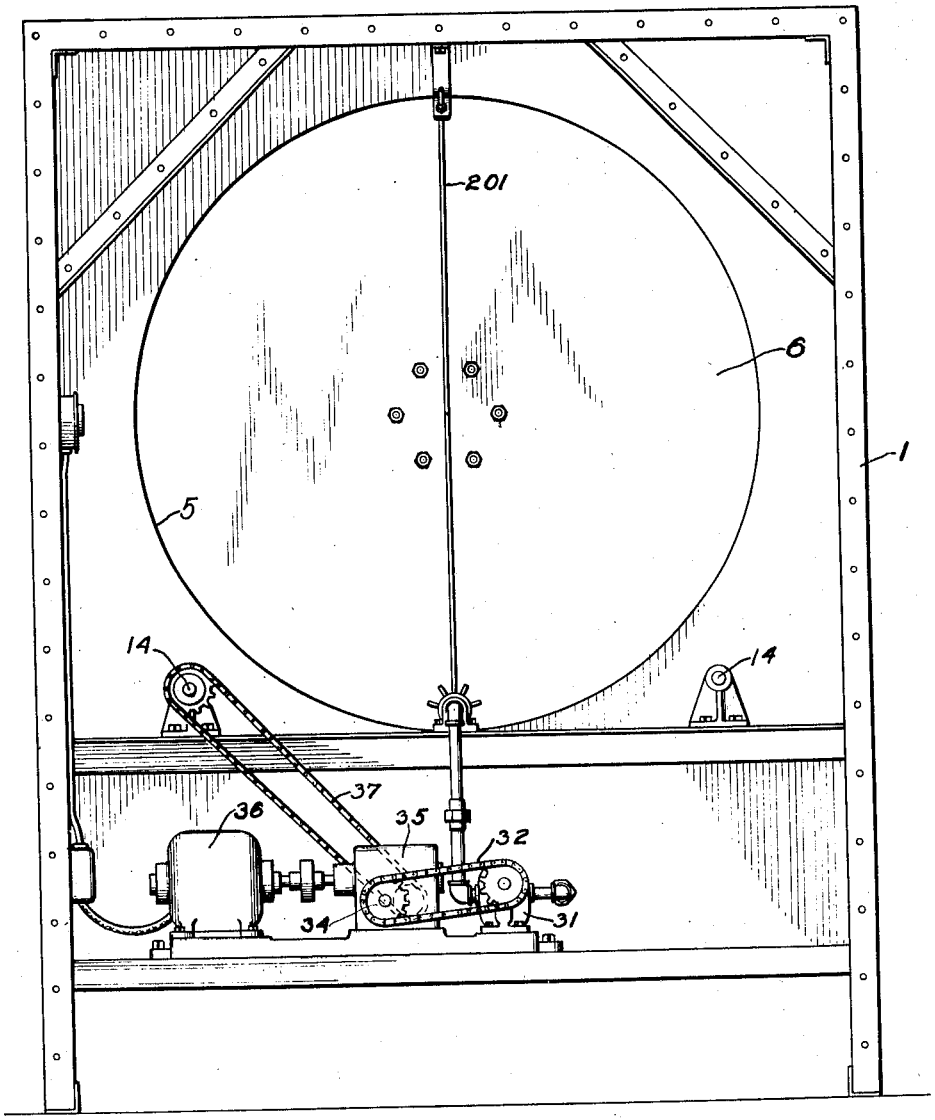
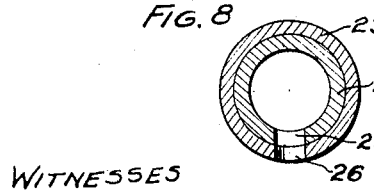
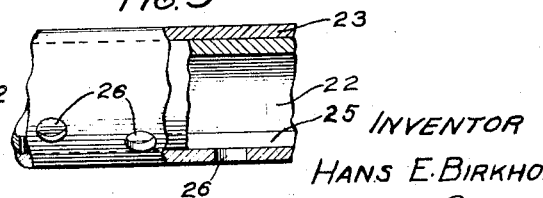
INVENTOR
HANS E. BIRKHOLZ

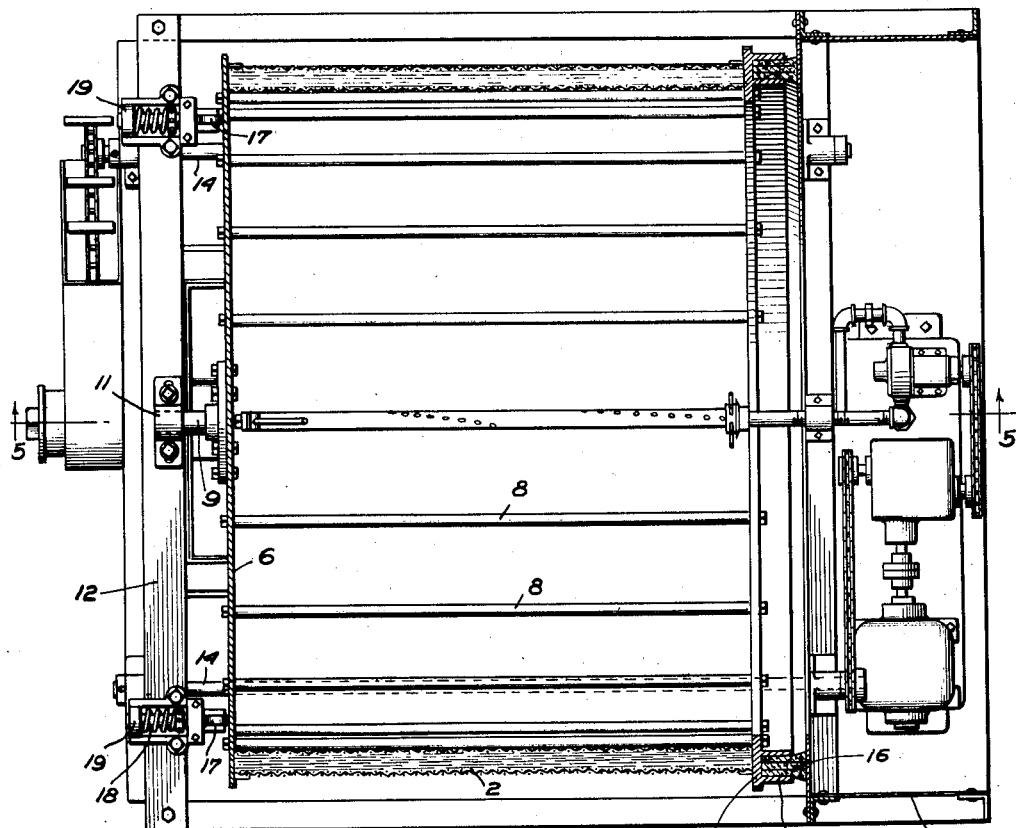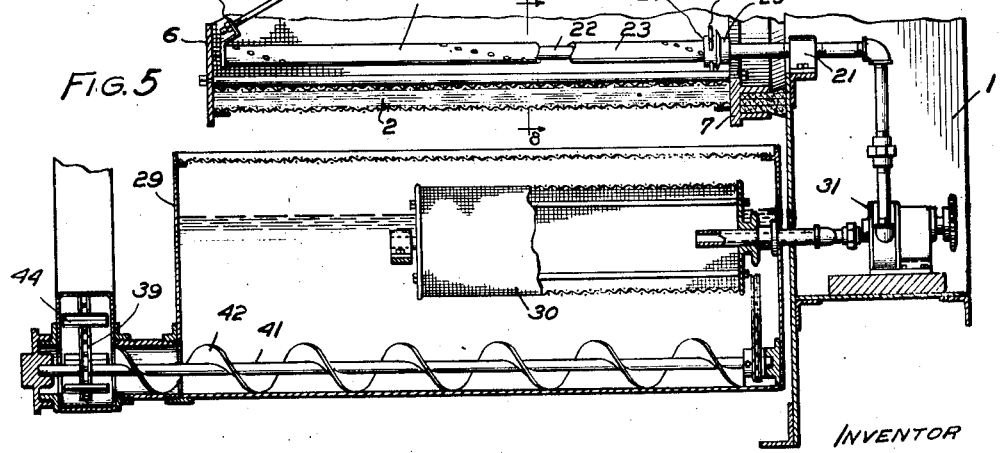

Patented Nov. 6, 1928.

1,690,813

UNITED STATES PATENT OFFICE.

HANS E. BIRKHOLZ, OF CHICAGO, ILLINOIS, ASSIGNOR TO NATIONAL AIR FILTER COMPANY, OF CHICAGO, ILLINOIS, A CORPORATION OF ILLINOIS.

AIR FILTER.

Application filed September 24, 1926. Serial No 137,537.

This invention relates to improvements in air filters of the horizontal cylinder type, wherein air is drawn in through a cylindrical filter screen which is slowly rotated in relation with a stationary oil distributor so that the screen is cleaned and recoated by oil flowing oppositely to the air flow.

The main objects of this invention are to provide a more perfect and efficient filter and an improved and simplified construction for the same; to provide an improved drum construction, improved means for mounting and driving the drum, in combination with improved means for accomplishing a tight joint between the drum and wall of the duct housing; to provide an improved method and means for washing the fabric or filter screen whereby different spots across the width are washed by a small stream of oil which is continually shifted until the whole area of the screen is covered, in order to use a minimum amount of oil and to use the fabric until it is highly impregnated with dust, at which point the greatest efficiency is apparently obtained; to provide an improved oil circulating system, including means for continuously removing the sediment from the bottom of the oil collecting tank.

An illustrative embodiment of this invention is shown in the accompanying drawings, in which:

Fig. 3 is a view looking into the air filter, looking from the right hand side of Fig. 1.

Fig. 4 is a plan section taken substantially on a horizontal plane through the axis of the drum.

Fig. 5 is a vertical section taken on line 5—5 of Fig. 2.

Fig. 8 is an enlarged section of the distributor head, and is taken substantially on line 8—8 of Fig. 5.

Fig. 9 is a fragmentary enlargement of the oil distributor member with portions shown in section.

Figure 1:
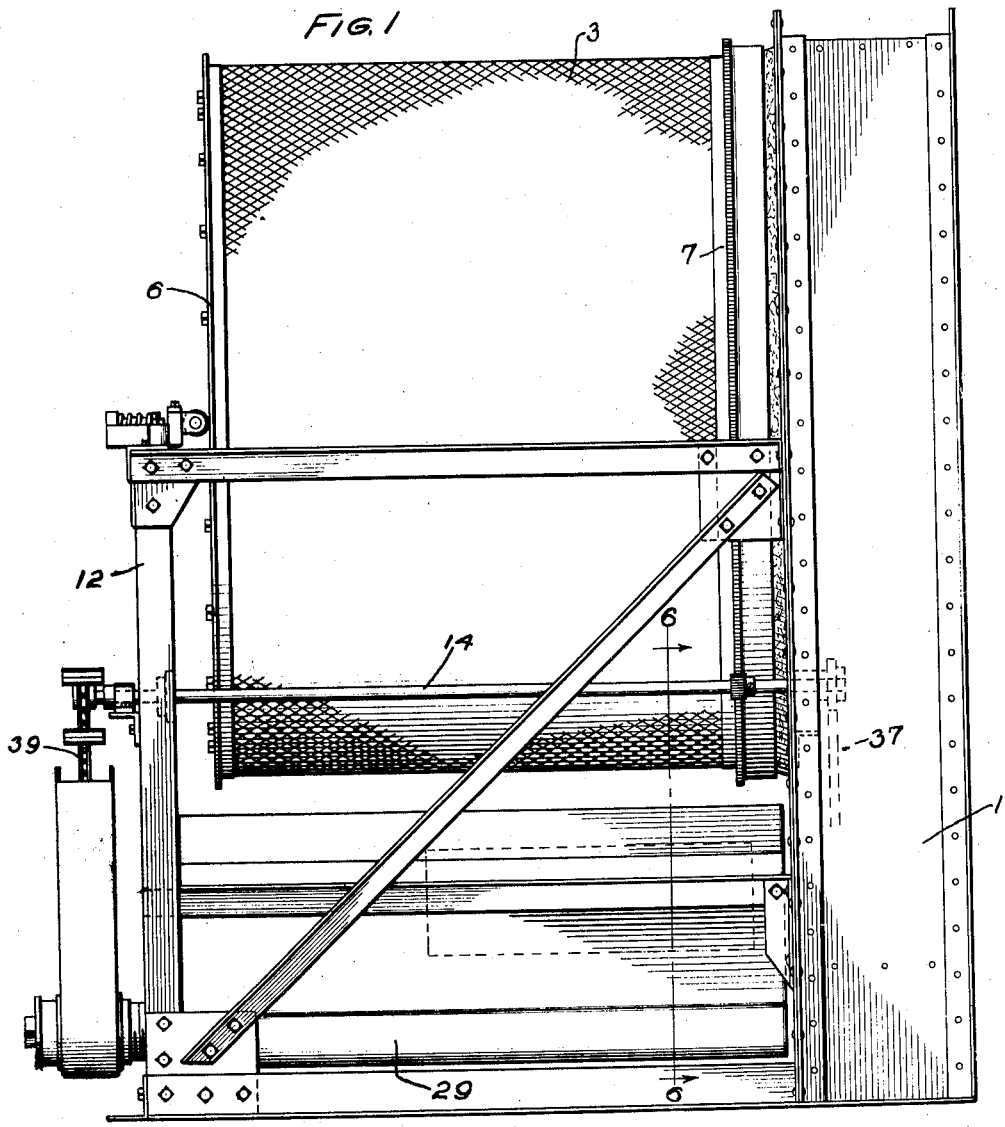
Fig. 1 is a side elevation of the complete drum type air filter unit.

The filter unit shown in the drawings connects into the duct system at the open end of the rectangular sheet metal and angle iron frame housing 1 which also forms an air duct; and likewise to the intake of the supply blower which sucks the air in through the filter screen 2 which forms the cylindrical walls of the drum 3, which is mounted with the open end against the aperture 5 in the outer end wall of the housing or duct 1.

Figure 7:
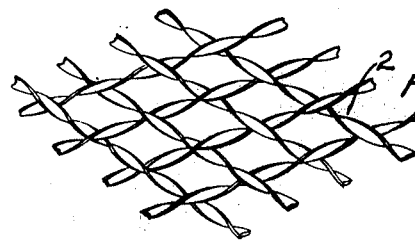
Fig. 7 is a detail of the preferred form of the filter screen fabric.
Figure 2:
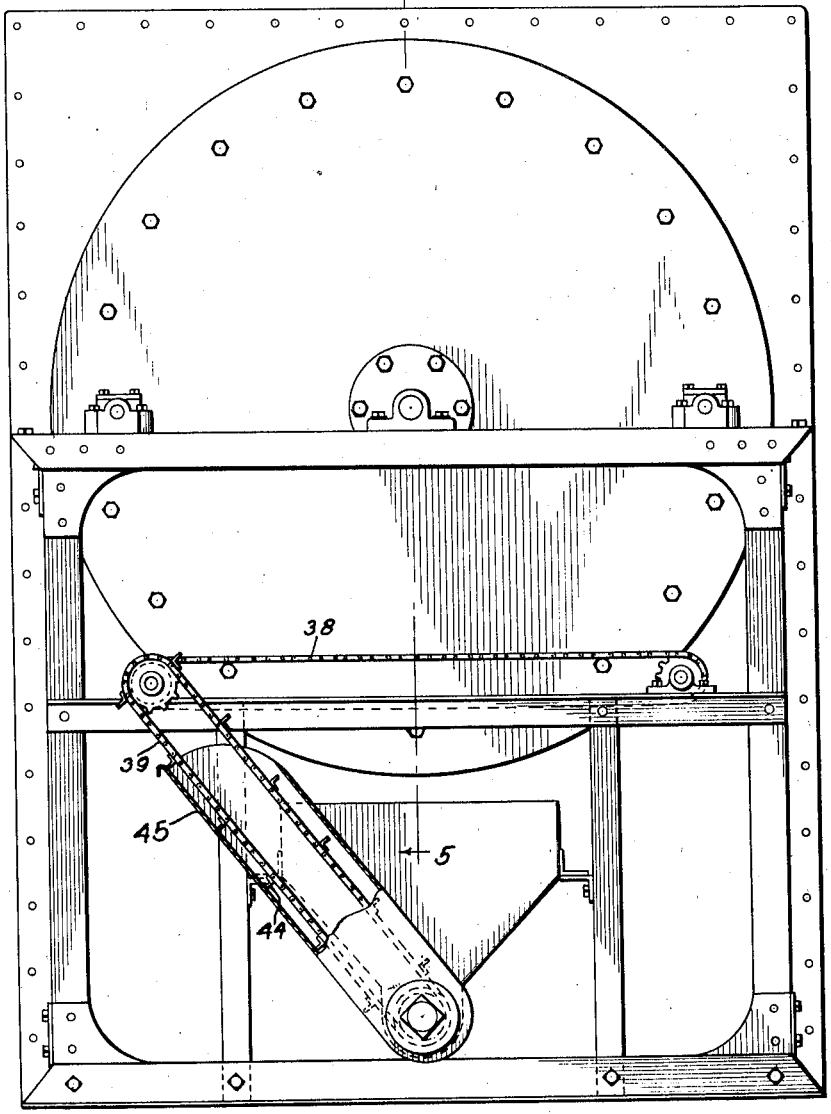
Fig. 2 is an elevation of the out-board end of the same.
Figure 6:
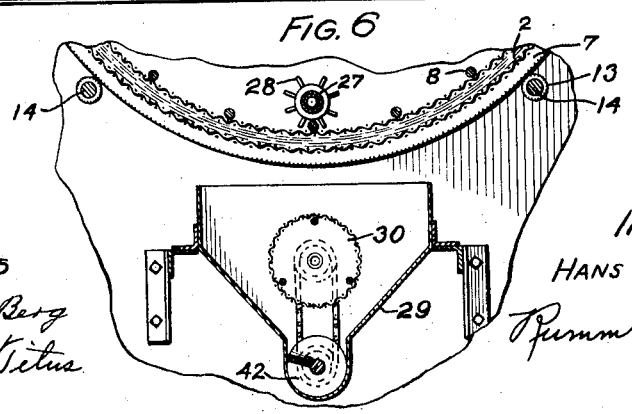
Fig. 6 is a transverse section taken on line 6—6 of Fig. 1.

The drum 3 comprises a circular plate 6 which encloses the outer end, and a cast ring 7 at the inner end. The end members 6 and 7 are secured in spaced relation by means of the tie rods 8 which are arranged in a circle near the edges of the end members, and form a support for the filter fabric 2. The ends of the rods 8 are reduced to provide a shoulder and the reduced ends pass through the flanges of the end members and are secured by nuts on the outer side. Preferably the screen is formed of a tinsel-like woven copper fabric, as shown enlarged in Fig. 7, which is wrapped around outside of the rods in superposed layers, a layer of heavy woven wire fabric being usually supplied at the top and bottom layer. The ends are banded on the outer side. This provides an extremely simple and effective construction and the fabric itself is relieved of all strains.

An arbor 9 is secured in a flange 10, bolted to the center of the plate 6, and turns in an out-board bearing 11, secured to the frame 12, for supporting the outer end of the drum. At the inner end, the rim of the ring 7 is toothed and engages with the correspondingly toothed wheels 13 which are rigidly mounted on the two parallel shafts 14. The shafts 14 are rotatably mounted in the frame 12 in spaced relation to form a cradle for supporting the ring 7. In this manner, the drum 3 is supported at three points,—at the center of one end and at either side of the other end by rollers which are rotated and drive the drum with very low friction.

An annular channel 15 is formed in the face of the end ring 7 for receiving the fibrous packing annulus 16, which is inserted between the end of the drum 3 and the wall of the housing 1. Anti-friction rollers 17, mounted in spring pressed forks 18 which are slidably held in brackets 19, atached to the frame work 12, ride against the surface of the end plate 6 and hold the packing 16 against the wall of the duct housing. This reduces friction and prevents leakage at the end of the drum.

The general arrangement of the oil circulating system is best illustrated in Fig. 5, which shows the oil distributor 20 supported in a bracket 21, which is secured to the wall plate of the housing 1, with the outer end supported by a tie-rod 201 which is attached to the top of the housing 1, as shown in Fig. 3.

The distributor 20 comprises an inner pipe 22, which is rigidly held in the bracket 21, and a sleeve 23 which is rotatably mounted on the pipe 22, between the end plate 24 to which the tie-rod 201 fastens, and a collar 25, fixed on the pipe 22.

The pipe 22 has a straight slot 22^A in the under side within the sleeve 23, and the sleeve is apertured with a series of holes 26 in spiral arrangement. (See Figs. 5, 8, and 9.) At the inner end of the sleeve, a collar 27, having radially extending pins 28, is secured; and, as the drum 3 is slowly rotated, the rods 8 engage the pins 28 and turn the sleeve to bring the series of holes 26 successively into register with the slot 25.

The distributor 20 is positioned on the inside of the drum 3 and extends across the filter screen 2 at the lower side. A coating and washing oil of suitable quality is pumped out of the drain tank 29, supported below the drum in the frame 12, through the cylindrical strainer 30, which is rotatably mounted in the tank 29, by means of the motor driven oil pump 31, and supplied to the pipe 22 of the distributor.

The pump 31, preferably of the gear impeller type, is connected by the chain 32 to the drive sprocket 34 of the gear reduction unit 35, which is direct connected to the motor 36. A second chain 37 connects from the speed reduction unit 35 to one of the drum support and drive shafts 14, described above. The shafts 14 are connected by the chain belt 38, and the upper end of the inclined sludge conveyer belt 39 runs over a sprocket 40 on the shaft 14.

The lower end of the belt 39 runs over a sprocket fixed on the shaft 41 of the screw flight conveyer 42 which is rotatably mounted in the bottom of the tank 29. The screen 30 is driven from the shaft 41 through the chain belt 43; and the conveyer belt 39 is provided with blades or buckets 44 which operate on the lower side of the inclined housing 45 which reaches above the top of the tank 29.

In operation, through the driving connection to the motor 36, the air filter drum, the suction screen 30, the screw conveyer 42, and the bucket conveyer 39, are slowly rotated.

Air is drawn through the meshes of the filter screen 2 by means of the supply blower of the ventilating system with which the air washing unit is used. The filter screen 2 is saturated with oil from the distributor 20 and retains the dust and impurities in the air, which are collected by the film of oil on the surface of the metallic screen fabric.

Since more dust is collected when the oil films are partly filled with dust, it is considered more desirable to use the screen until the dust begins to clog up the fissures and increase the resistance to the air flow; also it is desirable to use as little oil as possible so that there is not surplus oil to become entrained in the circulating air. These objects are attained in a novel manner by the distributor 20. Since, in the construction shown, the spiral of the holes 26 passes twice around the sleeve, oil is constantly pouring out onto the screen through two small streams, and the streams are in effect continually moved across the screen, as the screen is slowly moved along. The result is that the screen is washed in spots which join up into spiral paths which wind about and finally completely cover the whole area. Only a small area of newly washed screen is in the air stream at one time and a very small amount of oil may be used without using such a small aperture or so low a pressure that the aperture could clog.

By means of the sediment removing arrangement shown and described above, the dirt is removed from the oil continuously, with no special attention being required as heretofore, so that the operation of the filter is now completely automatic. In the prior constructions, such devices as a bag filter was used, and every so often the bag had to be removed and cleaned of a very filthy slimy mass. In this invention the dust collecting in the bottom of the tank is slowly worked to the outer end of the tank when it is caught by the buckets on the conveyer belt 39 and slowly moved upward along the bottom of the conveyer housing. This allows the oil to drain out and a nearly dry mass is finally discharged at the upper end of the housing or trough.

While but one illustrative embodiment of this invention has been shown and described, it is obvious that many omissions and alterations may be made without departing from the spirit of the invention as defined in the following claims.

I claim:

1. An air filter comprising a filter drum closed at one end and open at the other, a stationary air duct contiguous to the open end of the drum, an annulus of soft packing between the open end of the drum and said air duct, means for supporting and rotating the drum, and resilient means for pressing the drum toward the air duct to cause said packing to make a sealed connection between said drum and duct.

2. An air filter comprising a stationary air duct, a filter drum closed at one end and open at the other end, said open end abutting against and communicating with said duct, a packing annulus located between the end of the drum and said duct for sealing communication therebetween, means for rotatably supporting the drum, and anti-friction rollers resiliently pressed against said closed end for pressing said drum against said packing.

3. In an air filter having an oil circulating system, including a tank for receiving and collecting the oil, a screw conveyer across the bottom of the tank, and a bucket conveyer in receiving relation with the screw conveyer, and means for slowly driving said conveyers so that the sediment is continuously removed from the tank without removing an appreciable amount of the oil.

4. The process of oiling and washing a foraminous cylindrical filter screen comprising successively traversing areas of relatively small axial extent of the screen with a stream of oil while rotating said screen, so that only a relatively small axially extending area of the screen is in a newly washed condition at any one time.

5. In an air filter, a filter drum, an arbor in the center of one end thereof for supporting said end of said drum, a bearing support for said arbor, a gear ring mounted on the outside of the other end of said drum, a pair of rotatable supports journaled one at each side of and below the center of gravity of said drum for supporting said end of said drum, gear teeth on one of said rotatable supports for meshing with said ring gear, and means for driving said toothed rotatable support for driving said drum.

6. The process of oiling and washing a foraminous cylindrical filter screen comprising traversing the cylindrical surface in a helical path with a stream of oil so that only a relatively small axially extending area of the screen is in a newly washed condition at any one time.

Signed at Chicago this 21st day of September, 1926.

HANS E. BIRKHOLZ.